United States Patent
Bicik

(10) Patent No.: US 12,323,483 B2
(45) Date of Patent: Jun. 3, 2025

(54) METHOD FOR AUTOMATIC SELECTION OF SERVERS

(71) Applicant: ABB Schweiz AG, Baden (CH)

(72) Inventor: Josef Bicik, Prague (CZ)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 18/361,299

(22) Filed: Jul. 28, 2023

(65) Prior Publication Data
US 2024/0039985 A1 Feb. 1, 2024

(30) Foreign Application Priority Data
Jul. 29, 2022 (EP) .................................. 22187886

(51) Int. Cl.
*H04L 67/1001* (2022.01)
*H04L 67/1004* (2022.01)
*H04L 67/12* (2022.01)

(52) U.S. Cl.
CPC ...... *H04L 67/1001* (2022.05); *H04L 67/1004* (2013.01); *H04L 67/12* (2013.01)

(58) Field of Classification Search
CPC .. H04L 67/1001; H04L 67/1004; H04L 67/12
See application file for complete search history.

(56) References Cited

U.S. PATENT DOCUMENTS

| | | | | |
|---|---|---|---|---|
| 5,903,455 A | * | 5/1999 | Sharpe, Jr. | G05B 19/0423 700/83 |
| 5,980,078 A | * | 11/1999 | Krivoshein | G06F 9/44505 700/1 |
| 6,047,222 A | * | 4/2000 | Burns | G05B 19/4184 714/6.32 |
| 6,058,394 A | * | 5/2000 | Bakow | G06F 16/283 707/999.102 |

(Continued)

FOREIGN PATENT DOCUMENTS

WO WO 2014/189706 A2 11/2014

OTHER PUBLICATIONS

Brendan Galloway and Gerhard P. Hancke. "Introduction to Industrial Control Networks", IEEE Communications Serveys & Tutorials, vol. 15, No. 2, Second Quarter 2013, 21 pages. (Year: 2013).*

(Continued)

*Primary Examiner* — G. C. Neurauter, Jr.
(74) *Attorney, Agent, or Firm* — Leydig, Voit & Mayer, Ltd.

(57) ABSTRACT

A computer-implemented method for automatic selection of servers includes executing, on a computing device, a web application, the web application configured to provide a location-specific and/or site-specific operator workplace, the operator workplace providing a user interface allowing an operator to interact with an industrial control system at the location and/or site. The method further comprises executing, on the computing device, one or more service worker (Continued)

modules. The service worker modules are configured to provide access to workplace information for providing the operator workplace to the web application, and perform, by means of a selection logic, an automatic selection of a server among a plurality of servers including local servers at the location and/or site.

13 Claims, 2 Drawing Sheets

(56) References Cited

U.S. PATENT DOCUMENTS

| | | | | |
|---|---|---|---|---|
| 7,098,771 | B2* | 8/2006 | Lefebvre | G05B 19/056 |
| | | | | 340/286.01 |
| 7,305,475 | B2* | 12/2007 | Tock | H04L 69/329 |
| | | | | 709/227 |
| 7,702,401 | B2* | 4/2010 | Eryurek | G05B 23/0264 |
| | | | | 702/182 |
| 7,814,234 | B2* | 10/2010 | Hawkins | G06F 16/9574 |
| | | | | 709/227 |
| 7,925,979 | B2* | 4/2011 | Forney | G06F 16/954 |
| | | | | 715/744 |
| 8,132,042 | B2* | 3/2012 | Jordan | H04L 69/40 |
| | | | | 714/4.1 |
| 8,234,384 | B2* | 7/2012 | Fisher | H04L 69/40 |
| | | | | 709/227 |
| 8,356,246 | B2* | 1/2013 | Noferi | H04L 67/143 |
| | | | | 715/234 |
| 8,731,895 | B2* | 5/2014 | Anne | G05B 19/0426 |
| | | | | 703/23 |
| 8,745,281 | B2* | 6/2014 | Petzen | H04L 61/5038 |
| | | | | 710/9 |
| 9,046,881 | B2* | 6/2015 | Blevins | G05B 19/0428 |
| 9,239,574 | B2* | 1/2016 | Tandon | G05B 19/056 |
| 9,280,426 | B2* | 3/2016 | Soldi | G05B 19/048 |
| 9,363,335 | B2* | 6/2016 | Han | H04L 67/01 |
| 9,507,336 | B2* | 11/2016 | Tandon | G05B 19/0428 |
| 9,983,559 | B2* | 5/2018 | Blevins | G05B 17/02 |
| 10,372,095 | B2* | 8/2019 | Heutger | G06F 11/1654 |
| 11,022,950 | B2* | 6/2021 | Martinez Canedo | G06F 8/41 |
| 11,275,365 | B2* | 3/2022 | Anderson | F16K 37/0083 |
| 11,860,611 | B2* | 1/2024 | Lutz | G05B 19/0428 |
| 2005/0065913 | A1 | 3/2005 | Lillie et al. | |
| 2005/0120081 | A1* | 6/2005 | Ikenn | H04L 69/40 |
| | | | | 707/999.009 |
| 2010/0141596 | A1* | 6/2010 | Junk | G06F 3/04886 |
| | | | | 345/173 |
| 2011/0302511 | A1* | 12/2011 | Chomik | G05B 19/4186 |
| | | | | 715/760 |
| 2015/0363484 | A1* | 12/2015 | Kamath | G06F 16/907 |
| | | | | 707/751 |
| 2017/0372600 | A1* | 12/2017 | Palin | H04W 4/80 |
| 2019/0098095 | A1 | 3/2019 | Innes | |
| 2019/0149619 | A1 | 5/2019 | Lisac et al. | |
| 2021/0194983 | A1 | 6/2021 | Rouse et al. | |

OTHER PUBLICATIONS

Gambhir et al., "Analysis of Cache in Service Worker and Performance Scoring of Progressive Web Application," *2018 International Conference on Advances in Computing and Communication Engineering (ICACCE)*, 294-299, (Jun. 22-23, 2018).

European Patent Office, Extended European Search Report in European Patent Application No. 22187886.1, 11 pp. (Jan. 23, 2023).

* cited by examiner

METHOD FOR AUTOMATIC SELECTION OF SERVERS

CROSS-REFERENCE TO RELATED APPLICATIONS

The instant application claims priority to European Patent Application No. 22187886.1, filed Jul. 29, 2022, which is incorporated herein in its entirety by reference.

FIELD OF THE DISCLOSURE

The present disclosure generally relates to a method for automatic selection of servers, a computing device, a computer program product, and a computer-readable medium.

BACKGROUND OF THE INVENTION

The present invention concerns an interaction of an operator with an industrial control system, for example a Distributed Control Systems, DCS, or the like, using a web application, specifically, an operator workplace provided by the web application, running on a computing device used by the operator.

Use of web applications, while advantageous for different reasons, provides challenges when the computing device is moved between locations and/or sites. For example, at some locations and/or sites permanent network connectivity may not be ensured. This may be due to poor coverage of WiFi and/or mobile networks like, 3G, 4G, or 5G networks, or interference in some industrial applications.

This may cause problems in terms of the device being able to connect to local servers and/or making a suitable operator workplace available.

BRIEF SUMMARY OF THE INVENTION

The present disclosure describes a method that alleviates at least some of the above disadvantages, particularly, allows for reliably ensuring availability of a server and suitable operator workplace.

Embodiments of the present disclosure include a computer-implemented method for automatic selection of, and optionally automatic switchover between, servers. The method comprises executing, on a computing device, a web application, the web application configured to provide a location-specific and/or site-specific operator workplace, the operator workplace providing a user interface allowing an operator to interact with an industrial control system at the location and/or site. The method further comprises executing, on the computing device, one or more service worker modules. The service worker modules are configured to provide access to workplace information for providing the operator workplace to the web application, and perform, by means of a selection logic, an automatic selection of a server among a plurality of servers including local servers at the location and/or site. Optionally, the service worker modules may be configured to perform automatic switchover to the server.

Thus, the approach allows for high reliability for ensuring connection with a suitable server and availability of the required workplace, even when moving between locations and/or sites, particularly even when a web server connection is not available.

BRIEF DESCRIPTION OF THE SEVERAL VIEWS OF THE DRAWING(S)

DETAILED DESCRIPTION OF THE INVENTION

Figure 1:
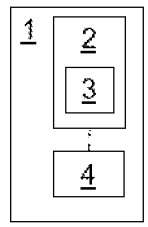
FIG. 1 illustrates a schematic representation of a computing device according to the present disclosure.

FIG. 1 shows a computing device 1 according to the present disclosure. FIG. 1 also, for illustration purposes, indicates a web application 2 executing on the computing device and a user interface 3 of a location-specific and/or site-specific operator workplace provided by the web application. Moreover, reference sign 4 represents one or more service worker modules, which is/are also executed on the computing device.

As an example, the computing device may be a portable computing device like a mobile phone, tablet computer, laptop, or the like. The web application may run in a web browser and, particularly, may be a progressive web application. The user interface may be or comprise a graphical user interface, for example having one or more windows displayed on a display device and comprising user input elements, implemented in hardware and/or rendered as part of the graphical user interface.

Figure 2A:
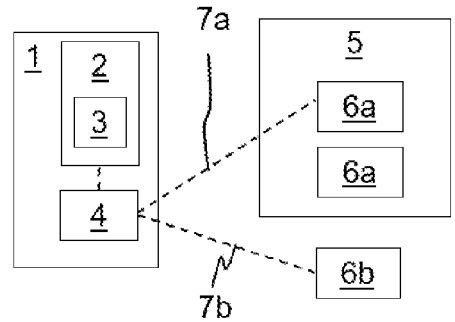
FIGS. 2a and 2b are schematic representations of systems in which the computing device or method of the present disclosure may be employed.
Figure 3A:
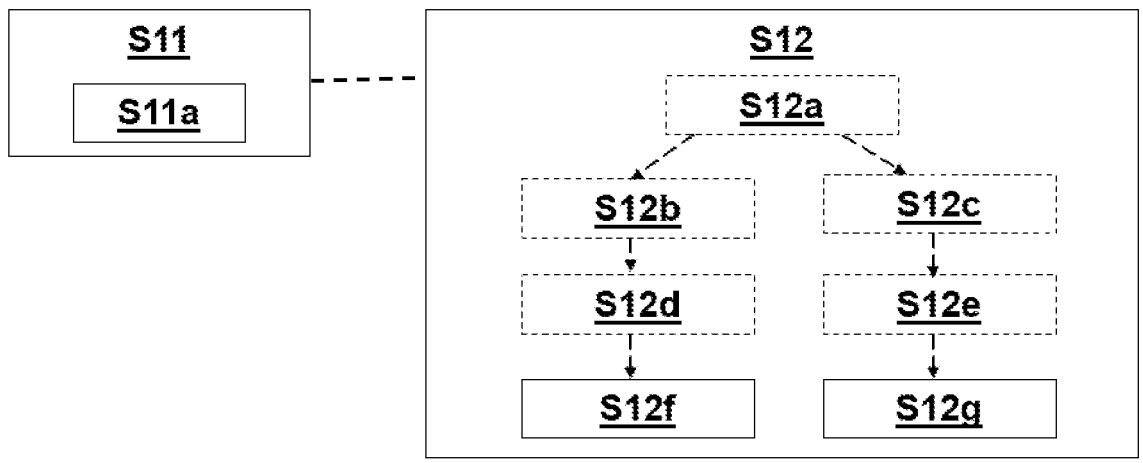
FIGS. 3a and 3b are flowcharts illustrating methods according to the present disclosure.
Figure 3B:
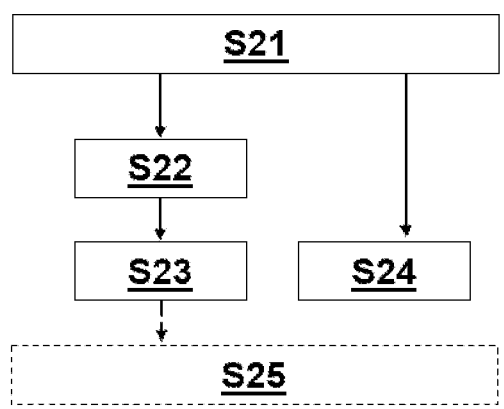

The device 1 is configured to carry out the method of the present disclosure, e.g., as claimed and/or described above, and configured to carry out the methods described in the context of FIGS. 3a and 3b. FIG. 2a shows a system in which the computing device 1 according to the present disclosure, e.g., the computing device of FIG. 1, may operate and/or in which the method of the present disclosure may be applied.

The system may comprise an industrial control system 5, for example a distributed control system, DCS, and a plurality of servers 6a, 6b. The servers may comprise one or more local servers 6a and/or a web server 6b.

Connections 7a and 7b connecting the computing device and the servers are also shown for illustrative purposes. The connection may be selected by the one or more service worker modules, which is illustrated by the dashed lines representing the connections leading to the one or more service worker modules 4.

Figure 2B:
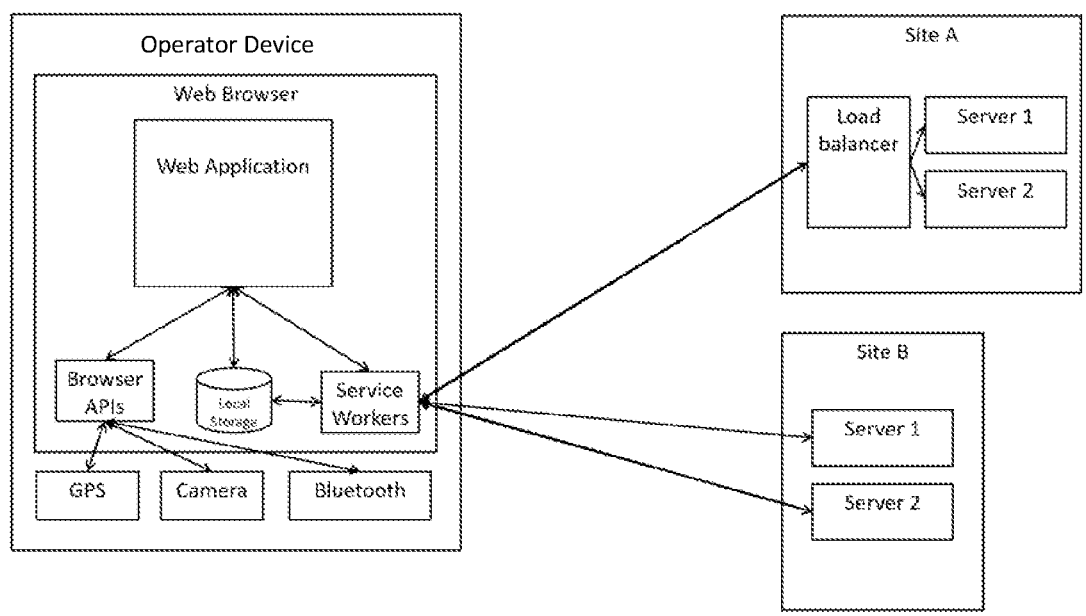

FIG. 2b also shows another system in which the computing device 1 according to the present disclosure, e.g., the computing device of FIG. 1, may operate and/or in which the method of the present disclosure may be applied.

A computing device in the form of a portable device is shown. A web browser runs on the computing device and a web application and service worker modules are executed on the computing device, e.g., as part of the browser. The browser may also provide APIs and access local storage. The APIs, as an example, may allow for the web browser to communicate with a camera, a GPS system, and/or communication interfaces like Bluetooth, mobile communication and/or WiFi interfaces. It is noted that this is only one possible example and other configurations of the device are possible.

The system shown in FIG. 2b, in which a device of the present disclosure may operate, also illustrates two different sites, wherein site A has a load balancer that allows for switching between multiple servers of the site (Server 1 and Server 2 are shown as examples). Site B also has multiple servers (Server 1 and Server 2 are shown as examples) but does not have a load balancer at least for some of the servers.

Thus, site A implements server-side redundancy using load balancers, while site B relies on parallel redundancy and the client switching between two servers. The two servers shown at each site may, for example, hold identical information.

FIG. 2b also illustrates the interaction of the web application with interfaces provided by web browser, with local storage, and with service worker modules, which may pre-cache information, e.g., in the local storage, and determine the most suitable way to connect to (e.g., back-end) servers, for example Server 1 or Server 2 at site B.

FIG. 3a is a flowchart illustrating a method according to the present disclosure. The method comprises step S11 of executing a web application on a computing device, e.g., as part of a browser. The computing device may be a portable computing device. For example, any of the computing devices described in the present disclosure, particularly the one shown in FIG. 1, may be used. The web application may, particularly, be a progressive web application.

When executing the web application, the web application will provide, in step S11a, a location-specific and/or site-specific operator workplace, the operator workplace providing a user interface allowing an operator to interact with an industrial control system, e.g. a DCS, at the location and/or site.

The method also comprises step S12 of executing one or more service worker modules. When executing, the service worker modules may perform one or more of the steps described below.

In an optional step S12a, information to be made available for offline use, in particular, server information and/or workplace information may be determined by means of the one or more service worker modules. This step may be performed prior to transporting the computing device to a location and/or site where it is expected that said information will be required, particularly, at a time when an internet connection can be reliably established.

The method may comprise, by the one or more service worker modules, the optional step S12b of making information available for offline use, in particular, site-specific server information and/or location-specific, e.g., geocoded, server information and/or time-specific server information. For example, this may comprise information determined in step S12a. This step may be performed prior to transporting the computing device to a location and/or site where it is expected that said information will be required, particularly, at a time when an internet connection can be reliably established.

The method may comprise, by the one or more service worker modules, the optional step S12c of making at least some of the workplace information available for providing the operator workplace available for offline use, in particular, site-specific and/or location-specific and/or time-specific workplace information. For example, this may comprise information determined in step S12a. This step may be performed prior to transporting the computing device to a location and/or site where it is expected that said information will be required, particularly, at a time when an internet connection can be reliably established. Steps S12b and S12c, if both are performed, may be performed subsequently or concurrently.

The method may comprise, by the one or more service worker modules, the optional step S12d of retrieving information associated with one or more servers for a current location and/or site. For example, this may be performed after having transported the computing device to the location and/or site, particularly, when the computing device is at the location and/or site. Some of the information may, for example, be information retrieved from a local storage or cache and/or some of the information may, for example, be information retrieved on site. For example, information on site may be obtained in different ways that may include receiving the information from a server and/or other device on site and/or by evaluating images captured by the camera of the computing device. The latter may be achieved by scanning a code, e.g., QR code, for example.

The method may comprise, by the one or more service worker modules, the optional step S12e of retrieving workplace information associated with a current location and/or site. For example, this may be performed after having transported the computing device to the location and/or site, particularly, when the computing device is at the location and/or site. Some of the information may, for example, be information retrieved from a local storage or cache and/or some of the information may, for example, be information retrieved on site. For example, information on site may be obtained in different ways that may include receiving the information from a server and/or other device on site and/or by evaluating images captured by the camera of the computing device. The latter may be achieved by scanning a code, e.g., QR code, for example.

If both, steps 12d and 12e are performed, they may be performed subsequently or concurrently. When some of the information retrieved in step S12e is to be retrieved from a local server, step S12d may be performed first and a connection to the local server may be established and then the information may be retrieved from the local server.

The method comprises, by the one or more service worker modules, step S12f of performing by means of a selection logic, an automatic selection of a server among a plurality of servers including local servers at the location and/or site. For example, this may be performed after having transported the computing device to the location and/or site, particularly, when the computing device is at the location and/or site. In particular, the step may be performed taking into account information retrieved in optional step S12d.

The method of the present disclosure also comprises, by the one or more service worker modules, step S12g of providing, to the web application, access to workplace information for providing the operator workplace. The information may comprise the information retrieved in optional step 12e, for example.

FIG. 3b is another flowchart illustrating a detailed example of a method according to the present disclosure carried out by executing a web application and one or more service worker modules according to the present disclosure on a computing device.

The method comprises step S21, wherein the one or more service worker modules, which make information available for offline use, the information comprising server information for one or more site-specific and/or location-specific servers and optionally site-specific and/or location-specific workplace information. For example, based on information derived from a calendar application or shift-management system, the service worker modules may determine where an operator and their associated computing device are expected to be located in an upcoming time period, e.g., at which site(s) and/or location(s). Information associated with said site(s) and/or location(s), e.g., expected web-server availability and/or information on local servers and/or information concerning the site that allows for deriving which workplace information is expected may be used to determine information to be made available for offline use.

The method of FIG. 3b comprises step S22, wherein the one or more service worker modules, which automatically select, upon arrival at the location and/or site and/or upon local server unavailability, an available server by means of the selection logic and based on the server information made available for offline use and optionally information received at the current site and/or location.

The method of FIG. 3b comprises optional step S23, carried out by the one or more service worker modules, which connect to the available server selected in step S22.

The method of FIG. 3b comprises step S24, carried out by the one or more service worker modules, which provide information required for providing the operator workplace to the web application. At least some of this information may be retrieved from the available server selected in step S22 and optionally connected to in step S23. Some of this information may also be information that had previously been made available for offline use, e.g., in step S21.

The method of FIG. 3b comprises step S25, carried out by the one or more service worker modules, which optionally perform a switchover to another server. In particular, the switchover may be a switchover from a local server to another local server of the same site, for example. This may be performed when a local sever becomes unavailable or when it is determined that the server does not provide the desired functionality and/or data.

The method of FIG. 3b may comprise carrying out the above steps on a computing device, particularly in the form of portable user device, e.g., cell phone, tablet computer, or laptop. As an example, the computing device may be a computing device as described above in the context of FIG. 1.

Some further aspects and examples of the present disclosure will be outlined below.

As explained above, the present disclosure uses web application, e.g., progressive web application, combining local storage of a web browser with service worker modules to direct connections to specific servers based on clients' location or other factors. A hybrid approach towards redundancy combining server-side (e.g., load balancers) with client-side redundancy may be accomplished. Moreover, the service workers can also use pre-cached data (e.g., drawings, user manuals, etc.) if no servers are reachable (i.e., offline mode). Optionally, based on a shift management system the application can determine that a user will be dispatched to a remote site without Intranet and/or Internet connectivity and while still connected to the currently available (e.g., office) network it can pre-load data that could be used during the remote job.

As seen from the above, the present disclosure may provide intelligent and self-adapting switching algorithms, may forecast the user's activities, e.g., based on daily schedules, and may cache possibly relevant information for later use when network connectivity might be limited. It may also enable a user to access certain devices using local connection. All the functionalities may be based on a purely thin client technology. Moreover, the present disclosure allows for intelligent caching based on data from daily schedules or shift management systems and user's location to make certain data available offline.

As seen above, the present disclosure may provide a, for example progressive, web application and service worker modules (web workers), e.g., to load a workplace, make it available for offline use, and handle logic for back-end switchover to another (set of) server(s), e.g., based on user's location (e.g., GPS, Bluetooth, RFID, NFC, QR Code scan, WiFi network ID, IP address range).

The method may entail identifying a user's tasks during a shift by checking a workforce management system, calendar, or checklists. It may load additional server URLs based on locations involved and may temporarily cache (or updates existing) content that is likely going to be needed during the day, particularly when not on a fast connection. The method may provide list of temporary server URLs, where each entry has a lifetime assigned (e.g., based on shift duration), which may be queried by the web application. The availability of local server(s) may also be indicated in a UI, e.g., in the workspace. The querying might optionally consider the geo-location (if available) to query servers in a preferred order.

As can be seen from the above, advantages of the present disclosure entail more flexible deployments with better network segmentation and thus security, reduced dependency on DNS, reduction of data volumes transferred over more expensive connections, higher data availability in off-line scenarios (e.g., manuals, schematics, etc.), lower application footprint of the web application.

An example of a data structure that can be used to hold information about a list of servers is shown below. The data structure may be in JSON format in this example or alternatively in XML, or another suitable format. In the example, geo-location is defined as a list of coordinates (latitude and longitude being labelled "lat" and "lon, respectively) defining a polygon representing an area for which a given list is valid. There may optionally also be a temporal restriction of validity of certain nodes ("validFrom" and "validTo" statements).

```
{
    "sites": [
        {
            "name": "Site A",
            "validFrom": "2012-03-19T07:22Z",
            "validTo": "2099-03-19T07:22Z",
            "geolocation": [
                {
                    "lat": 34.3,
                    "lon": 23.4
                },
                {
                    "lat": 38.3,
                    "lon": 23.4
                },
                {
                    "lat": 34.3,
                    "lon": 43.4
                }
            ],
            "servers": [
                "192.168.1.1",
                "node1.localdomain"
            ]
        },
        {
            "name": "Site B",
            "validFrom": "2012-03-19T07:22Z",
            "validTo": "2099-03-19T07:22Z",
            "geolocation": [
                {
                    "lat": 14.3,
                    "lon": 13.4
                },
                {
                    "lat": 48.3,
                    "lon": 23.8
                },
                {
                    "lat": 34.3,
                    "lon": 43.4
                },
```

```
        {
            "lat": 54.3,
            "lon": 53.4
        }
    ],
    "servers": [
        "192.168.10.1",
        "webserver.site2"
    ]
    }
  ]
}
```

The above example is shown specifically for GPS and that the data structure might be different for a different geo-location method. For Bluetooth it might contain addresses of Bluetooth beacons, for example. For WiFi it might include WiFi network names (SSID) or addresses of access points.

The list may get initially populated and updated as follows. For the first connection the application may be loaded from an initial URL and then fetch the list. The list can get updated by consecutive loads of the application when connected to a back-end and also via push notifications triggered by the back end (e.g., transmitted via a WebSocket channel).

While the invention has been illustrated and described in detail in the drawings and foregoing description, such illustration and description are to be considered exemplary and not restrictive. The invention is not limited to the disclosed embodiments. In view of the foregoing description and drawings it will be evident to a person skilled in the art that various modifications may be made within the scope of the invention, as defined by the claims.

An operator workplace may comprise a user interface, for example a graphical user interface to be presented by the computing device, providing controls for an operator to interact with the industrial control system. The interaction with the industrial control system may comprise accessing data from and/or sending data to the industrial control system. For example, data from the industrial control system may comprise monitoring data, one or more alarm lists, process graphics, and/or trend views, and/or their respective configurations, and/or user manuals and/or documentation. For example, data sent to the industrial control system may be software updates, maintenance data, and/or control data, which may comprise, for example commands such as new set points and/or alarm acknowledgements. The data may also comprise usage statistics and/or configuration chances.

The workplace information for providing the operator workplace may comprise information that represents a configuration of the user interface for a specific operator workplace and/or information that represents data an operator is enabled to interact with via the workplace, for example, technical documentation and/or data to be sent to the industrial control system.

A site-specific workplace may be a workplace configured in a manner that is specific to one or more given sites, e.g., sites having a specific configuration of machine components and/or a specific control system configuration. As such, user interface elements to be displayed and/or data to be used by the computing device may be different for different sites.

A location-specific workplace may be a workplace configured in a manner that is specific to one or more given locations, the locations associated with one or more sites and/or machines. As such, user interface elements to be displayed and/or data to be used by the computing device may be different for different locations. A location may be a predetermined local area, which may be defined, for example, by a range of coordinates, e.g., a range of GPS coordinate pairs.

The one or more service worker modules being configured to provide access to the workplace information to the web application may comprise that the one or more service worker modules retrieve information from one or more sources, which may be part of the computing device or external to the computing device, and providing them to the web application, and/or may comprise that the one or more service worker modules route information retrieval queries of the web application to a suitable recipient, e.g., direct connections to specific servers.

The one or more service worker modules performing, by means of a selection logic, an automatic selection of a server among a plurality of servers including local servers at the location and/or site, may comprise, for example, selection among currently available server on the basis of predetermined criteria, for example, availability, connectivity, technical capabilities, or the like, and/or may comprise selecting the highest-ranking available server of an ordered list of servers.

A web application may be an application software that runs in a web browser. A service worker module may be a web worker, for example a web worker implementing a proxy functionality. A service worker module may, for example, be configured to check availability of a server and/or to cache content while a server is available for later use by the web application. As another example, a service worker module may intercept and potentially redirect network requests from the web application.

An industrial control system may be any known industrial control system, for example a distributed control system, DCS, or the like. An industrial control system may be a computerized control system controlling operation of an industrial process. As an example, industrial process may include chemical processes, pharmaceutical process, and/or electrical processes, or the like. Industrial control systems may be employed at different sites, for example stationary sites like factories or non-stationary sites like ships.

A local server may be a server that is accessible via a local network at a given site and/or location.

The computing device may be a user device, particularly a portable user device. The user device may be a workstation, a mobile phone, tablet computer, laptop, and the like. A switchover may comprise switching from a connection with one server to a connection with another server. The switching may be seamless when connectivity with the one server was not lost before connecting to the other server. This might happen for a user on the move based on a location, for example. The benefit may be an improved support of island models where certain parts of a plant run in isolation thus increasing the overall security.

If connectivity with the one server is lost prior to connecting to the other server, the switchover may not be seamless. However, as will be seen below, some information may optionally be made available for offline use on the computing device, which may mitigate any consequences by a disruption of connectivity.

According to the present disclosure, the automatic selection may be performed in response to a local server unavailability and/or upon arrival at the location and/or site. Alternatively, or in addition, the automatic selection may also be based on time as a criterion, e.g., indicating an upcoming power-down and/or update of a local server, optionally based on notification provided by the local server. For example, a server could be tagged for maintenance and the user device may seamlessly switch to other servers before it is powered down. Such information could be pushed to the device, which may update its server list(s) accordingly.

A local server unavailability may comprise unavailability due to a server failure of the local server and/or unavailability due to a local server not being accessible, i.e., because a connection with the local server is not possible, e.g., due to a network issue or because the computing device has moved out of the range where a connection with the local server is possible.

Arrival at the location and/or site may entail the computing device coming into a range of connectivity of one or more local servers at the location and/or of the site. As such, the method of the present disclosure allows for selection of a server in different scenarios, e.g., establishing an initial connection to a server upon arrival at a site and/or switching to a different server if a server becomes unavailable, which may be due to a network or server issue, network issue, or due to movement of the computing device. Thus, the method allows for high reliability due to flexibly addressing different issues.

According to the present disclosure, the one or more service worker modules may make information available for offline use, in particular, site-specific server information and/or location-specific, e.g., geocoded, server information and/or time-specific server information.

Offline use may refer to a use of the computing device that is not connected to a web server. Making information available for offline use may entail caching on the computing device.

Site-specific server information may be server information pertaining to servers of one or more specific sites. For example, the information made available offline may be specific to one or more sites that are determined to be relevant, for example based on expected upcoming sites to be visited by the computing device. An example could be a scheduled maintenance of a device where there is no network connectivity. In such a case, the application may pre-cache some static and dynamic information (e.g., events, maintenance records related to the device).

Location-specific information may pertain to information that is specific to a given location, for example to a predetermined local area, which may be defined, for example, by a range of coordinates. Geocoded information may be information that is specific to particular ranges of coordinate pairs describing a location of the computing device, for example GPS coordinate pairs or other means of geolocation.

For example, the information made available offline may be specific to one or more locations that are determined to be relevant, for example based on expected upcoming locations to be visited by the computing device.

Time-specific information may pertain to information that is specific to a given time or time period, e.g., for a given day or time of the day or a given upcoming period of time. Information being time-specific may, in particular, include that the information may be expired and/or marked as expired and/or deleted after a/the given time or time period. Time-specific information may, alternatively or in addition, indicate that the web application uses certain servers only during certain periods of time.

For example, the information made available offline may be specific to a time or period of time determined to be relevant, for example based on a time when the computing device is expected to need the information, e.g., a time when the computing device is expected to be at a given location and/or site.

Information may also, in addition to being time-specific, be location and/or site-specific, for example, when a computing device is expected to be at a given location or site at a given time or time period.

In particular, only the site-specific and/or location-specific and/or time-specific information, e.g., server information, for one or more selected sites and/or locations and/or times/time-periods may be made available for offline use.

The above features have the advantage that the amount of data to be made available offline can be reduced while reliably ensuring that relevant data is available.

According to the present disclosure the server information may comprise one or more lists of servers and/or one or more list of server URLs and/or addresses, e.g., IP addresses, in particular, site-specific lists, location-specific lists, and/or time-specific lists of servers and/or server URLs and/or addresses, e.g., IP addresses.

Such information allows for the service worker modules to reliably perform the server selection without requiring excessive amounts of memory usage.

According to the present disclosure, the one or more service worker modules may make at least some of the workplace information for providing the operator workplace available for offline use, in particular, site-specific and/or location-specific and/or time-specific workplace information.

In particular, only the site-specific and/or location-specific and/or time-specific workplace information for one or more selected sites and/or locations and/or times/time-periods may be made available for offline use.

The above features allow for a workplace to be built reliably even when there is no network connectivity while avoiding excessive amounts of data being made available offline.

The method of the present disclosure may comprise, by means of the one or more service worker modules, automatically determining the information to be made available for offline use, in particular, the server information and/or a workplace information.

In particular, the step may be performed when a network connectivity is available for the computing device and/or prior to the computing device being moved to a different location and/or site.

The service worker modules are particularly suitable for performing such steps, as they may serve as a proxy between the web application and other applications and/or data stores and/or connections. Particularly, they may interface with calendar applications or the like to retrieve information not available to the web application itself.

According to the present disclosure, the automatically determining the information to be made available for offline use may be performed based on automatically forecasting, e.g., for a predetermined upcoming period, one or more sites and/or locations for which to make information available for offline use, in particular, based on a workforce or shift management system, and/or a calendar, and/or a task list.

That is, in many cases information will be available that allows for the service worker modules to automatically derive where a computing device is expected to be at a given time or within a given period and/or whether a specific type of use or user is expected at that time or within that period of time. The service worker modules may leverage this information to determine the information to be made available for offline use tailored to the expected site and/or location and/or type of use and/or user.

As an example, the workforce or shift management system, calendar, and/or task list may allow for deriving the tasks at hand, i.e., expected type of use, the expected user of the computing device, and/or the expected location and/or site for a given time. As an example, based on information indicating that there will be low bandwidth connectivity at a site, some more complex process graphics may be cached to reduce call-up times of specific HMI views/displays.

It is to be understood that the information may be made available for offline use for one or more sites and/or locations. This may be advantageous when a computing device is expected to be used at different sites and/or locations in an upcoming period of time and it cannot be ensured that the computing device will be able to go online.

According to the present disclosure, the method may comprise the one or more service worker modules retrieving workplace information associated with a current location and/or site. Alternatively, or in addition, the method may comprise the one or more service worker modules retrieving information associated with one or more servers for a current location and/or site, in particular, a list of server URLs of the servers of the current location and/or site, so as to perform selection of, and optionally switchover between, servers.

That is, the service worker modules may have the function of retrieving the required information from a storage, e.g., a cache, where the information was made available for offline use and/or from a server that is currently available and/or via a data connection with another device currently available to the computing device, e.g., via Bluetooth or NFC.

As such, the service worker modules may have the capability to leverage any information currently available for proper server selection. This improves reliability.

According to the present disclosure, the current location and/or site may be determined by the computing device, in particular using information received via a communication interface and/or based on sensor data, particularly location data obtained by a positioning system.

For example, the device running the web application may retrieve location data via GPS and/or based on the mobile network and/or based on information provided by the local network and/or other from devices to which it may connect via the communication interface.

Thus, the one or more service worker modules may selectively retrieve the workplace information and/or server information associated with the determined site and/or location.

The location and/or site-specific information can be reliably identified and retrieved for the current location and/or site, even if location and/or site-specific information for different sites is available, e.g., available for offline use. In other words, the selection of correct information can be ensured by determining the current location and/or site.

According to the present disclosure, the retrieving described above, e.g., of workplace information and/or server information, may comprise retrieving information made available for offline use, particularly pre-cached on the computing device. Alternatively, or in addition, the retrieving may comprise retrieving information obtained at the current location and/or site, particularly obtained by the computing device via a communication interface and/or based on sensor data, particularly location data obtained by a positioning system and/or optical information obtained by a camera.

In terms of optical information, a code, e.g., bar code or QR code may be leveraged to obtain information. The information may be coded into the bar code or QR code or may be accessible via a link or connection information coded into the bar code or QR code.

An advantage of retrieving information obtained at the current location and/or site is that this may ensure that information is up to date and/or may allow for supplementing information that may not have been available in advance and/or at a web server.

As one example, the method of the present disclosure may comprise that the one or more service worker modules perform the following steps.

The one or more service worker modules may make information available for offline use, the information comprising server information for one or more site-specific and/or location-specific servers and optionally site-specific and/or location-specific workplace information. Upon arrival on the site and/or local server unavailability, one or more service worker modules may automatically select, and optionally connect to, an available server by means of the selection logic and based on the server information made available for offline use and optionally information received at the current site and/or location. The service worker modules may, particularly subsequently to these steps, provide information required for providing the operator workplace to the web application. Optionally, the service worker modules may perform an automatic switchover based on a selection made using the selection logic, e.g., when a server becomes unavailable.

According to the present disclosure, the automatically selecting, and optionally connecting, may be performed based on a priority list of servers accessible to the one or more service worker modules. As an example, a switchover logic may apply a load balancing algorithm such as round robin, weighted round robin, random order, or the like.

A priority list of servers may, for example, be among the information made available for offline use and/or may be created and/or updated at a current site and/or location based, at least in part, on information made available at the current site and/or location. The priority may be determined based on objective criteria including, but not limited to, technical capabilities of each server and/or connectivity with the server and/or availability of the server.

According to the present disclosure, the method steps of the method according to the present disclosure, may be implemented for use with a thin client. This allows for performing the method even on devices being limited in terms of storage and/or computing power, e.g., mobile devices.

According to the present disclosure the web application may be a progressive web application or a single page JavaScript application as an alias. Progressive web applications are particularly suited for use with service worker modules, particularly for employing service worker modules for caching and retrieving information and handling server connections.

The invention also provides a computing device, particularly a portable computing device, configured to run the web application and the one or more service worker modules so as to carry out the method of the present disclosure. The computing device may comprise at least a processor, and optionally a memory unit. The computing device may be mobile phone, tablet computer, laptop or the like, for example.

The invention also provides a computer program product comprising instructions which, when the program is executed by a computer, cause the computer to carry out any of the methods of the present disclosure.

The invention also provides a computer-readable medium comprising instructions which, when executed by a computer, cause the computer to carry out any of the methods of the present disclosure.

The features and advantages outlined above in the context of the method similarly apply to the computing device, the computer program product, and the computer-readable medium described herein.

Further features, examples, and advantages will become apparent from the detailed description making reference to the accompanying drawings.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A computer-implemented method for automatic selection of servers, the method comprising:
    executing, on a computing device, a web application configured to provide a location-specific and/or a site-specific operator workplace providing a user interface allowing an operator to interact with an industrial control system at a current location and/or site; and
    executing, on the computing device, one or more service worker modules configured to:
        provide access to workplace information for providing the operator workplace to the web application,
        retrieve server information associated with a plurality of servers comprising local servers at the current location and/or site, wherein the server information indicates location-specific lists of servers associated with the current location and/or site-specific lists of servers associated with the site;
        deriving a task including an expected type of use or an expected user of the computing device based on a workforce or shift management system, a calendar, or a task list;
        based on the location-specific lists of servers associated with the current location and/or the site-specific lists of servers associated with the site, perform, utilizing a selection logic, an automatic selection of a server among the plurality of servers; and
        automatically determining, utilizing the one or more service worker modules, information to be made available for offline use, wherein the automatically determining the information to be made available for offline use is performed based on automatically forecasting, for a predetermined upcoming period of time, one or more sites and/or locations for which to make the information available for offline use based on the task, wherein the information comprises the server information and/or the workplace information, wherein the one or more service worker modules make at least a portion of the workplace information for providing the operator workplace available for offline use, wherein the portion of the workplace information comprises site-specific and/or location-specific and/or time-specific workplace information, wherein the time-specific workplace information indicates that the web application uses certain servers only during certain periods of time.

2. The method of claim 1, wherein the automatic selection is performed in response to a local server unavailability, upon arrival at the current location and/or site, is based on time as a criterion indicating an upcoming power-down and/or update of the local server, and/or based on notification provided by the local server.

3. The method of claim 1, wherein the one or more service worker modules make the information available for offline use including the server information.

4. The method of claim 1, further comprising the one or more service worker modules retrieving the workplace information associated with the current location and/or site, wherein the location-specific lists of servers and/or the site-specific lists of servers comprise a list of server URLs of the servers of the current location and/or site.

5. The method of claim 4, wherein the current location and/or site are determined by the computing device, using information received via a communication interface and/or based on sensor data.

6. The method of claim 4, wherein the retrieving comprises:
    retrieving the information made available for offline use, wherein the information comprises the server information and/or the workplace information, and wherein the information is pre-cached on the computing device, and/or retrieving the information obtained at the current location and/or site.

7. The method of claim 1, wherein the one or more service worker modules:
- make the information available for offline use, the information comprising the server information for one or more site-specific and/or location-specific servers and/or site-specific and/or location-specific workplace information;
- upon arrival at the location and/or site and/or local server unavailability automatically select, and connect to an available server via the selection logic and based on the server information made available for offline use and information received at the current site and/or location;
- providing the information required for providing the operator workplace to the web application; and
- performing a switchover to another server.

8. The method of claim 7, wherein the automatically selecting, and connecting, is performed based on a priority list of servers accessible to the one or more service worker modules.

9. The method of claim 1, wherein the method steps are implemented for use with a thin client and/or wherein the web application is a progressive web application.

10. The method of claim 5, wherein the sensor data is location data that is obtained by a positioning system.

11. The method of claim 6, wherein the information is obtained by the computing device via a communication interface and/or the information is obtained by the computing device based on sensor data.

12. The method of claim 11, wherein the sensor data comprises location data obtained by a positioning system and/or the sensor data comprises optical information obtained by a camera.

13. The method of claim 1, wherein retrieving the server information associated with the plurality of servers comprises retrieving the server information from a local storage cache associated with the current location and/or site, and wherein performing the automatic selection of the server is based on the location-specific lists of servers and/or the site-specific lists of servers that were retrieved from the local storage cache.

* * * * *